Dec. 15, 1964  O. A. HALEY  3,161,328
GRANULAR MATERIAL METERING MACHINE
Filed Oct. 8, 1962
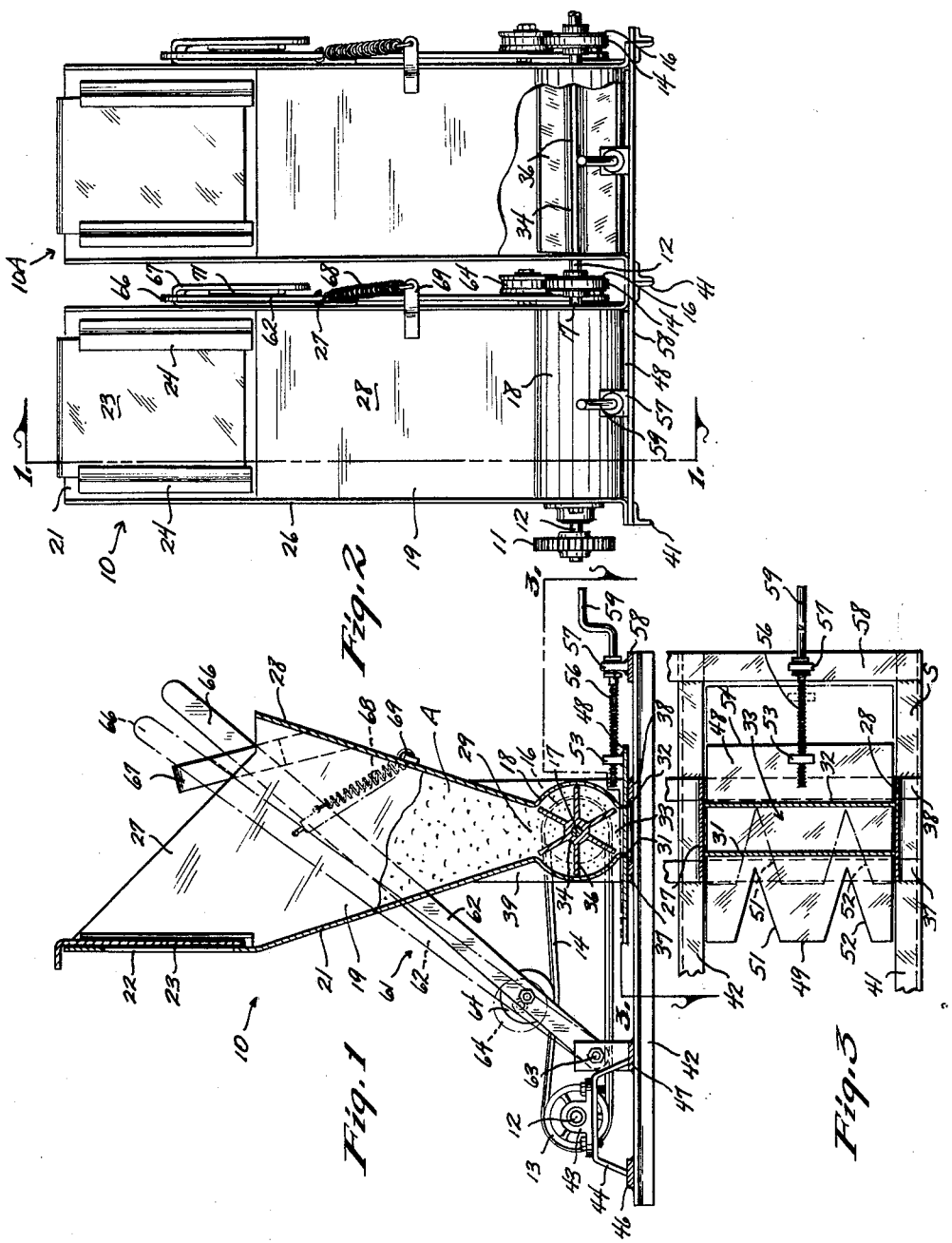
INVENTOR.
OLIVER A. HALEY
BY
Dick, Zarley & Henderson
ATTORNEYS
WITNESS
NORMAN G. TRAVISS 3,161,328
GRANULAR MATERIAL METERING MACHINE
Oliver A. Haley, 720 14th St. Place, Nevada, Iowa
Filed Oct. 8, 1962, Ser. No. 228,847
1 Claim. (Cl. 222—311)

This invention relates to granular material discharging apparatus and particularly to a machine for metering granular material.

With the vast quantities of granular material being mixed and blended, for example in the farm fertilizer and animal feed fields of present date, the provision of a simple, economical and accurate metering machine is of importance. Applicant has provided such a machine, which can be set up by itself or with a plurality of like machines for large scale operations, and which incorporates the feature of variably adjusting the rate of output of the machine. This machine is adapted particularly to meter certain elements added to fertilizers and animal feeds which are of a relatively small percentage of the total amount of the quantity of the material.

It is, therefore, an object of this invention to provide an improved granular material metering machine.

It is another object of this invention to provide a granular material metering machine wherein the normal rate of discharge of the material can be readily and accurately varied.

A further object of this invention is to provide for a granular material metering machine a pre-formed metering gate plate mounted for reciprocal cooperation with a discharge opening of the machine, the plate manually movable by the operator of the machine for variably adjusting the size of the discharge opening.

Yet another object of this invention is to provide a granular material metering machine which is simple of construction, economical of manufacture, and effective in operation.

These objects and other features and advantages of this invention will become more readily apparent upon reference to the following description when taken with the accompanying drawings, wherein:

FIG. 1 is a sectional view of the apparatus as depicted in FIG. 2, and with certain elements shown in alternate positions by the use of full and dotted lines therefor;

FIG. 2 is an elevational view of the apparatus as one looks at the apparatus in FIG. 1 from the right side thereof; and FIG. 3 is a fragmentary sectional view taken along the lines 3—3 of FIG. 1 and showing the gate plate in alternate positions as indicated by the full and dotted lines therefor.

Referring now to the drawing, the granular material metering machine of this invention is indicated generally at 10 in FIG. 1. In FIG. 2, a pair of the machines 10 and 10A are shown in a tandem arrangement, whereby upon rotation of a single drive gear 11, a common drive shaft 12 is rotated. Mounted on the drive shaft 12 is a pair of front pulley wheels 13 (only one showing), and to each of which is loosely mounted a belt 14.

Each belt is rotatably mounted on a rear pulley wheel 16 (FIG. 2) for each machine. Under normal conditions, each belt 14 is normally sufficiently loose about the wheels 13 and 16 such that rotation of the drive shaft 12 does not effect rotation of the rear pulley wheels 16.

Each shaft 17 (FIGS. 1 and 2) is inserted through the longitudinal axis of an elongated cylindrical chamber portion 18 of a housing 19 for holding a quantity of granular material therein. The housing 19 is comprised of a front wall 21 having an opening 22 in the upper portion thereof which is closeable by a panel 23 vertically reciprocal relative to the opening 22 and held between a transversely spaced pair of guides 24. The guides are mounted on the rear surface of the upper portion of the front wall 21 (FIG. 2). The housing 19 includes further a pair of side walls 26 and 27 (FIG. 2), and a rear wall 28.

As best illustrated in FIG. 1, the front wall 21 and the rear wall 28 converge toward each other as they depend to form an elongated throat 29 before diverging in a semicircular manner to form the chamber portion 18. At the lower edges 31 and 32 of the front and rear walls 21 and 28, respectively, an elongated discharge opening 33 is formed. The discharge opening 33 (FIG. 3) is thus defined by the lower edges 31 and 32, and by the side walls 26 and 27 of the housing.

Securely mounted on the shaft 17 is an elongated rotor 34 which has a plurality of radially extended vanes 36. The outer edges of the vanes 36 are adapted to move contiguous to the inner surface of the chamber portion 18, whereby upon rotation of the rotor 34, a predetermined quantity of material is moved from within the housing 19 to a position over the discharge opening 33 for discharge therethrough. Thus, depending upon the rotational rate of the rotor 34, a predetermined amount of material is discharged through the opening 33 at a predetermined rate of discharge. It will be noted by best referring to FIG. 1, that the arcuate distance between the outer edges of each pair of adjacent vanes 36 is substantially equal to the transverse width of the discharge opening 33.

The discharge opening edges 31 and 32 are spaced above a pair of parallel support bars 37 and 38 (FIGS. 1 and 3) on which the lower portions 39 of the side walls 26 and 27 are mounted. The bars 37 and 38 are in turn secured to and supported on a pair of parallel angle irons 41 and 42 which form the foundation structure of each machine 10. Referring to FIG. 1, it is seen that the shaft 12 is inserted through a bearing mounting 43 of which there are several depending upon the length of the shaft 12. Each bearing mounting 43 is mounted on a bracket 44 the legs of which are secured to a pair of support bars 46 and 47.

Slidably inserted between the discharge opening edges 31 and 32 and the bars 37 and 38 is a flat, gate plate 48 (FIGS. 1, 2 and 3). The plate 48 has a width substantially equal to the length of the discharge opening 33 as best illustrated in FIG. 3, and the plate 48 has a length several times the width of the discharge opening as measured between the edges 31 and 32.

One edge 49 of the plate 48 is provided with a transversely spaced pair of V-shaped notches or cutouts 51 and 52 of known dimensions. To reciprocally move the gate plate 48 beneath the discharge opening 33, a bracket 53 is secured to the end 54 thereof opposite the edge 49, and threadably inserted therethrough is a jack screw 56. The jack screw 56 is rotatably mounted for rotation in place in a bracket 57 mounted on a bar 58 secured between the angle irons 41 and 42. A handle 59 is provided for rotating the jack screw 56, which rotation causes the bracket 53 and the plate 48 to move relative to the discharge opening 33 toward and away from the bracket 57.

As mentioned hereinbefore, the belt 14 is normally loose such that rotation of the front pulley wheel 13 does not affect rotation of the rear pulley wheel 16. To move the belt 14 to a position where rotation of the front pulley wheel 13 does effect operation of the rear pulley wheel 16 and thus the rotor 34, a lever unit 61 (FIGS. 1 and 2) is provided. Unit 61 includes an elongated lever 62 pivotally mounted at 63 to the framework for the machine 10, and having a wheel 64 rotatably mounted thereon adjacent the lower end therof. The upper end 66 of the lever 62 is inserted through a U-shaped bracket 67 secured to one side 27 of the machine 10.

Within the bracket 67, the lever 62 is normally biased toward a lower positon, indicated by full lines in FIG. 1, by a spring 68 connected between the lever 62 and a projection 69 (FIG. 2) on the machine 10. In this position of the lever 62, the wheel 64 engages the belt 14 and forces a tension thereon sufficient to effect rotation of the rear pulley wheel 16 in response to rotation of the front pulley wheel 13. To release the tension of the belt 14, and thus to permit it to assume its normal inoperative condition, the lever 62 is raised against the bias of the spring 68 until it engages the upper part of the bracket 67, whereupon by moving the lever slightly laterally within the bracket 67, the lever 62 is engageable with a limit plate 71 (FIG. 2). By this arrangement, the lever 62 may be left unattended in its limit plate 71 engaging position, whereby the belt 14 is inoperative.

In operation of the machine 10, one or more machines, for example 10 and 10A, are placed side by side as illustrated in FIG. 2 above a hopper in which a certain amount of fed with a certain ratio of elements therein is to be mixed. The gate plates 48 are closed as illustrated by the full line gate plate 48 in FIG. 3. Each machine housing is filled with a quantity of material, for example machine 10 may have material A therein, and machine 10A may have material B therein.

Thus, upon movement of the lever 62 from its inoperative position best indicated by dotted lines in FIG. 1, to its operative position best indicated by full lines in FIG. 1, rotation of the front pulley wheel 13 effects rotation of the rear pulley wheel 16 which in return effects operation of the rotor 34. Rotation of the rotor 34 results in a discharge of the material A in machine 10 through the discharge opening 33 at a predetermined rate, depending upon the rate of rotation of the rotor 34. This rate of discharge of the material A is varied by the position of each gate plate 48. Thus, in the position of the gate plate 48 in FIG. 3, it will be seen that but a portion of the discharge opening 33 is actually available for discharge of the material A therethrough.

Thus, by reciprocally sliding the gate plate 48 for each machine to a predetermined position relative to the discharge opening 33, the rate of discharge of material from that machine may be metered to an extremely fine increment, depending upon the structure of the jack screw 56 and associated parts. In summation, a granular material metering machine has been described and disclosed hereinbefore which provides for discharging a granular material at a predetermined rate through a discharge opening, and which provides further for varying the rate of discharge of the material by varying the size of the discharge opening.

Some changes may be made in the construction and arrangement of my granular material metering machine without departing from the real spirit and purpose of my invention, and it is my intention to cover by my claims, any modified forms of structure or use of mechanical equivalents which may be reasonably included within their scope.

I claim:

An apparatus for discharging a measured amount of granular material comprising in combination,
 a container for holding a quantity of said material,
 said container having an elongated cylindrical chamber formed in the bottom thereof with an elongated discharge opening formed in said container below said chamber and parallel to the longitudinal axis of said chamber,
 said container having a vertical slidable gate plate in its upper portion,
 a rotor having a plurality of radially extended vanes rotatably mounted within said chamber, said vanes arcuately spaced at their outer edges a distance equal substantially to the arcuate transverse width of said elongated discharge opening,
 a flat horizontal gate plate reciprocally mounted below said elongated discharge opening, and adapted to vary the size of said discharge opening, one end of said horizontal plate having a pair of transversely spaced, V-shaped cutouts formed therein,
 a belt movable from a normal inoperative position connected to and for rotating said rotor,
 and pivotally mounted lever means biased against said belt to force said belt into said operative position, said lever means movable to a releasably locked position from said belt.

References Cited by the Examiner
UNITED STATES PATENTS

| | | | |
|---|---|---|---|
| 88,710 | 4/69 | Hodges | 222—311 |
| 229,013 | 6/80 | Schau | 222—311 |
| 618,637 | 1/99 | Benier | 74—242.11 |
| 719,895 | 2/03 | Smith | 74—242.11 |
| 914,024 | 11/09 | Mantius | 222—368 X |
| 2,122,695 | 7/38 | Podwyszynski | 222—368 |
| 2,188,235 | 1/40 | Simonson | 222—311 X |
| 2,852,166 | 9/58 | Gandrud | 222—311 |
| 2,947,450 | 8/60 | Wilson | 222—561 X |

LOUIS J. DEMBO, *Primary Examiner.*